(12) United States Patent
Sewell

(10) Patent No.: US 12,510,411 B2
(45) Date of Patent: Dec. 30, 2025

(54) APPARATUS FOR INDICATING TEMPERATURE OF A LIQUID INSIDE A BOTTLE

(71) Applicant: SEWELL INSTRUMENTS PTY LTD, Southport (AU)

(72) Inventor: Samuel John Sewell, Southport (AU)

(73) Assignee: Sewell Instruments Pty Ltd, Arundel (AU)

( * ) Notice: Subject to any disclaimer, the term of this patent is extended or adjusted under 35 U.S.C. 154(b) by 591 days.

(21) Appl. No.: 17/612,940

(22) PCT Filed: May 27, 2020

(86) PCT No.: PCT/AU2020/050531
§ 371 (c)(1),
(2) Date: Nov. 19, 2021

(87) PCT Pub. No.: WO2020/232514
PCT Pub. Date: Nov. 26, 2020

(65) Prior Publication Data
US 2022/0228916 A1 Jul. 21, 2022

(30) Foreign Application Priority Data
May 20, 2019 (AU) ............................. 2019203533

(51) Int. Cl.
*F21S 9/02* (2006.01)
*F21Y 115/10* (2016.01)
(Continued)

(52) U.S. Cl.
CPC .............. *G01J 5/0037* (2013.01); *F21S 9/02* (2013.01); *G01J 5/028* (2013.01); *G01J 5/03* (2022.01); *G01J 5/04* (2013.01); *F21Y 2115/10* (2016.08)

(58) Field of Classification Search
CPC ....... B65D 51/248; F21Y 2115/10; F21S 9/02
See application file for complete search history.

(56) References Cited

U.S. PATENT DOCUMENTS 9,674,323 B1 *  6/2017  Yu .................... H04M 1/0274
9,981,790 B1 *  5/2018  Ost .................... B65D 51/248
(Continued)

FOREIGN PATENT DOCUMENTS

| CN | 203479402 U | 3/2014 |
|---|---|---|
| CN | 205580603 U | 9/2016 |
| CN | 206756316 U | 12/2017 |

OTHER PUBLICATIONS

International Search Report mailed Jul. 23, 2020 for International Application No. PCT/AU2020/050531.
(Continued)

*Primary Examiner* — William J Carter
(74) *Attorney, Agent, or Firm* — Lippes Mathias LLP

(57) ABSTRACT

An apparatus for indicating temperature of a liquid inside a bottle includes a housing having an upper surface configured to support a bottle and a base surface configured to rest on a structure. The apparatus further includes a non-contact thermometer located inside the housing and one or more indicators to display or provide an indication of a temperature state of the bottle. The apparatus also includes a processor. The non-contact thermometer senses temperature of a bottle placed on the upper surface of the housing and sends signals relating to the temperature to the processor, wherein the processor is configured to alert a user if there is an increase in temperature state of the bottle.

18 Claims, 3 Drawing Sheets

(51) Int. Cl.
  *G01J 5/00*  (2022.01)
  *G01J 5/02*  (2022.01)
  *G01J 5/03*  (2022.01)
  *G01J 5/04*  (2006.01)

(56)  References Cited

U.S. PATENT DOCUMENTS 11,801,980 B1 * 10/2023 Siann .................. B65D 51/145
  2006/0291535 A1  12/2006 Craig et al.

OTHER PUBLICATIONS

Written Opinion mailed Jul. 23, 2020 for International Application No. PCT/AU2020/050531.
International Preliminary Report on Patentability issued Nov. 19, 2020 for International Application No. PCT/AU2020/050531.
International Preliminary Report on Patentability (Corrected Version) issued Nov. 19, 2020 for International Application No. PCT/AU2020/050531.

* cited by examiner

All possible LED colours. Each of the 7 LEDs can only be 1 colour.

Only blue LEDs show if cold, more blue = colder, 3 blue lights, very cold.

Only green LED shows if correct temperature

Only red LEDs show it hot, more red = hotter. 3 red lights, very hot.

All LEDs will flash if a temperature rise is dedected
on
off
on
off

APPARATUS FOR INDICATING TEMPERATURE OF A LIQUID INSIDE A BOTTLE

FIELD

The present invention relates to an apparatus for indicating temperature of a liquid inside a bottle. More particularly, the invention relates to an apparatus that indicates different temperature states of a baby feeding bottle.

BACKGROUND

Milk is an essential source of nutrition for newborns and infants before they are able to eat and digest other foods. For most mothers, it is easier and more efficient to breastfeed their baby with breastmilk. However, this may not be always possible and mothers or caretakers will need to rely on baby formulas or other forms of milk. A problem that many mothers or caretakers encounter when using baby formulas or other forms of milk is determining the temperature of the milk. Typically, the temperature of breast milk directly from the mother is approximately 37 degrees Celsius. Therefore, mothers and caretakers have customarily heated the milk to approximately 37 degrees Celsius to mirror the temperature of breast milk from the mother before feeding the milk to the baby.

However, determining whether the milk is at the right temperature can be difficult. If the milk is too hot, this may scald the baby's mouth and if the milk is too cold, the baby's appetite may be affected.

Traditionally, the method to test the temperature of the milk is by putting drops of milk on the back of a wrist or hand. However, this method is not reliable as each person perceives heat differently. Adults are also more tolerant to heat, therefore even if the adult perceives the milk to be at the right temperature, the milk may still be too hot for the baby.

Another method commonly used to test the temperature of the milk is by inserting a thermometer into the bottle to measure the temperature of the milk. However, most often, the thermometer is not configured to test milk temperature and does not provide any indication that the milk is at a temperature that is suitable for the baby to consume.

Another method that is seen in the marketplace is a feeding bottle with a temperature sensing and measuring plate on the bottle. The temperature sensing measuring plate can change colours with temperature which provides some type of indication of the temperature of the milk to the mothers and caretakers. However, the measuring accuracy of this method is relatively low and most often, mothers and caretakers will still find difficulty in determining the optimum temperature of the milk.

A further product available commercially is a bottle thermometer. The bottle thermometer comprises a base with a non-contact infrared thermometer. The bottle is placed on top of the base. The temperature of the bottle is displayed on a LCD display in numeric numbers and the colour of the display will change according to the temperature settings. Whilst this method provides a better indication of the temperature of the bottle when compared to previous methods, it still has a number of disadvantages. For example, the temperature is indicated in numeric numbers on a LED display. This means the temperature reading will become little use if the mother or caretaker does not recognise the optimum temperature range of the milk in the bottle for their baby (this is particularly the case if the caretaker is a babysitter or a grandparent who is not familiar with the optimum temperature range of the milk). Further, the thermometer essentially reads the surface temperature of the bottle and this may not accurately reflect the actual temperature of the milk inside the bottle. For example, if the bottle has been heated on a microwave oven, the milk might be at a significantly higher temperature than the exterior of the bottle, which may lead to a risk that milk that is too hot is given to the baby.

It will be clearly understood that, if a prior art publication is referred to herein, this reference does not constitute an admission that the publication forms part of the common general knowledge in the art in Australia or in any other country.

SUMMARY OF INVENTION

The present invention is directed to an apparatus for indicating temperature of a liquid inside a bottle, which may at least partially overcome at least one of the abovementioned disadvantages or provide the consumer with a useful or commercial choice.

With the foregoing in view, the present invention in one form, resides broadly in an apparatus for indicating temperature of a liquid inside a bottle, comprising:
   a housing having an upper surface configured to support a bottle;
   a base surface configured to rest on a flat structure;
   a non-contact thermometer, the non-contact thermometer located inside the housing; one or more indicators to display or provide an indication of the temperature state of the bottle; and
   a processor;
   wherein the non-contact thermometer senses temperature of a bottle placed on the upper surface of the housing and sends signals relating to the temperature to the processor, wherein the processor is configured to provide an indication to warn a user if there is an increase in temperature state of the bottle.

In one embodiment, the one or more indicators comprises an array of lights, such as an array of LED lights.

The array of LED lights may comprise a colour display of at least three colours to indicate a high temperature, an optimum temperature and a low temperature state of the bottle.

In one embodiment, the array of LED lights will display a first colour, such as a red colour when the temperature state of the bottle is high, preferably when the temperature is above 37.5° C. For example, the apparatus may be provided with three red LED lights. If the temperature is just above 37.5° C. (which is slightly too warm for a baby to drink), a single red LED light will illuminate. If the temperature is higher than that, the second and/or the third red LED lights will eliminate to indicate that the temperature of the bottle is higher.

In one embodiment, the array of LED lights will display a second colour, such as a green colour when the temperature state of the bottle is optimum, preferably when the temperature is in the range between 36.5° C. and 37° C. For example, the apparatus may be provided with one green LED light. If the temperature of the bottle is at the optimum range, that single green LED light will illuminate to indicate that the milk in the bottle is ready for drinking by a baby.

In one embodiment, the array of led lights will display a third colour, such as a blue colour when the temperature state of the bottle is too low, preferably when the temperature is below 36° c. For example, the apparatus may be provided with three blue led lights. If the temperature is just below 36° C., a single blue led light may illuminate to indicate that the temperature of the milk in the bottle is slightly too cool. If the milk in the bottle is cooler, the second and then the third blue led light may illuminate to indicate that the temperature of the milk of the bottle is even cooler.

The array of LED lights may be positioned in the circumference of the upper surface of the housing, suitably extending part way around the circumference.

In one embodiment, the non-contact thermometer is embedded in the center of the housing.

In some embodiments, the housing may be cylindrical or flat spheroidal in shape.

In one embodiment, the array of LED lights will intermittently flash if the temperature of the bottle is increasing as a result of uneven heating or excessive heating, or if the bottle has only just been removed from a heating environment. Suitably, all of the LED lights will intermittently flash if the temperature of the bottle is increasing as a result of uneven heating or excessive heating, or if the bottle has only just been removed from a heating environment.

It will be appreciated that other indications may be provided to warn the user that the temperature of the contents of the bottle is increasing. For example, if the one or more indicators comprises a liquid crystal display screen, a warning message such as "warning, temperature rising" may display. Alternatively, a background on the LED display may flash on and off.

It will be appreciated that a number of different indications may be provided to warn the user that the temperature of the contents of the bottle is increasing. The present invention encompasses all such possible indications In one embodiment, the housing comprises a battery.

In one embodiment, the non-contact thermometer is a non-contact infrared thermometer.

In one embodiment, the non-contact thermometer provides a signal indicative of the temperature of the contents of the bottle to the processor. The processor then processes that signal to (a) determine the temperature of the contents of the bottle, and (b) to determine if the temperature of the contents of the bottle is increasing over time. The processor then sends appropriate signals to the one or more indicators so that the appropriate indication of the temperature and/or a rise of temperature is provided by the one or more indicators. It will be understood that the non-contact thermometer is in communication with the processor to enable the processor to provide an indication of the temperature of the bottle and to alert the user of a rise in temperature of the bottle.

In one embodiment, the processor is configured to read a temperature of the bottle over a predetermined period of time.

In one embodiment, the processor calculates an average of the temperature recorded over the predetermined period of time.

In one embodiment, the predetermined period of time is 5 seconds.

In one embodiment, the predetermined period of time is 20 seconds.

In one embodiment, the processor will alert the user of an increase in the temperature of the bottle when the temperature of the bottle is higher than the average of the temperature recorded over the predetermined period of time.

In one embodiment, the processor calculates an average temperature over a relatively longer period of time and also calculates an average temperature over a relatively short period of time. If the average temperature calculated over the relatively short period of time is greater than the average temperature calculated over the relatively longer period of time, this indicates that the temperature of the contents of the bottle is increasing. In these circumstances, a warning sequence of lights or other warning display is displayed to warn the user that the temperature of the contents of the bottle is increasing. The relatively longer period of time may be between, say, 15 and 30 seconds, for example, about 20 seconds. The relatively shorter period of time may be between 1 second and 10 seconds, for example, about 5 seconds.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
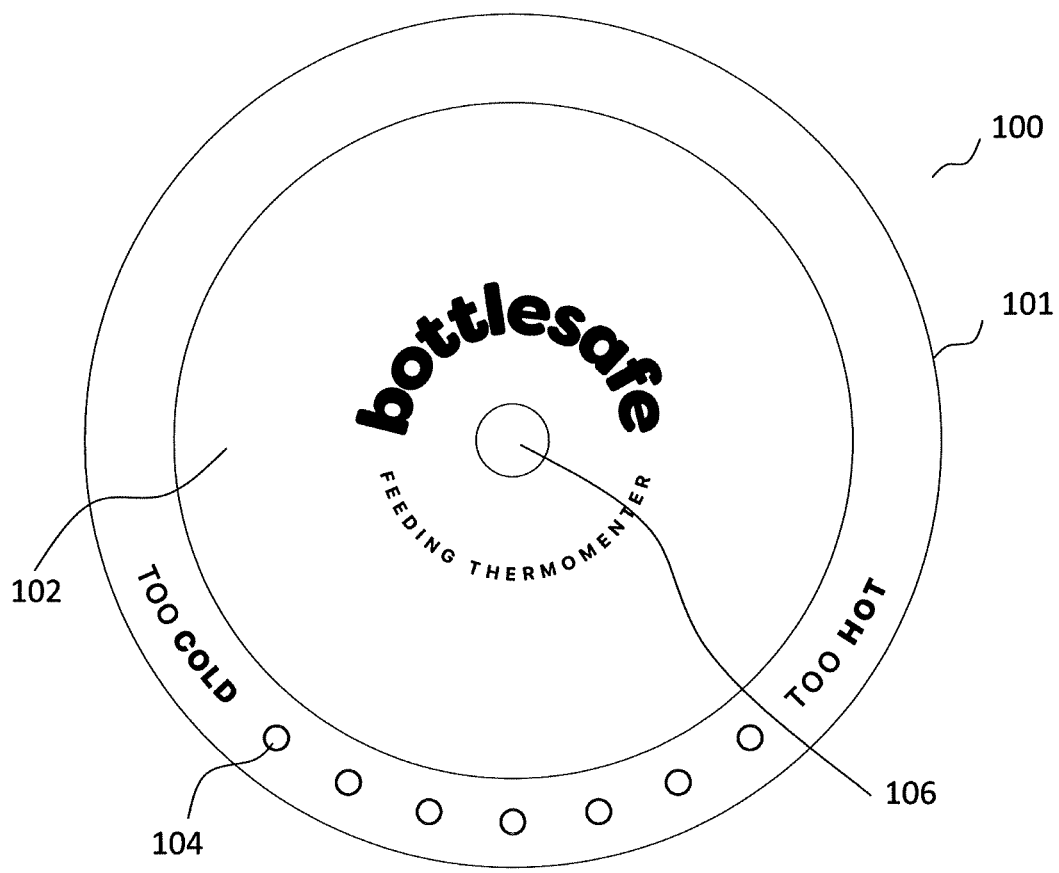
FIG. 1 is a top plan view of the preferred embodiment in accordance with the present invention.

According to an embodiment of the present invention, there is provided an apparatus for indicating temperature of a liquid inside a bottle 100 as shown in FIG. 1. The apparatus comprises a housing 101. The housing has an upper surface 102 which is configured to receive or support a bottle. The housing also has a base surface 103 which rests on a flat surface such as a table top or counter top. On the upper surface 102, there is an array of light emitting diode (LED) lights 104. In a preferred embodiment, the LED lights 104 are located on the perimeter of the upper surface of the housing.

Figure 3:
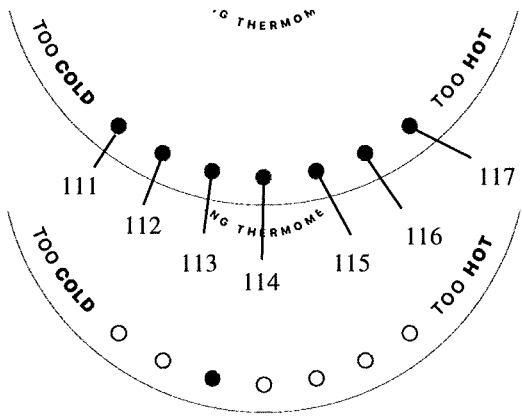
FIG. 3 is a schematic representation of the preferred embodiment showing the illumination of the array of LED lights at different temperature state of the bottle.
Figure 3:
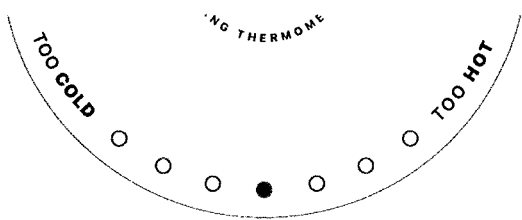
Figure 3:
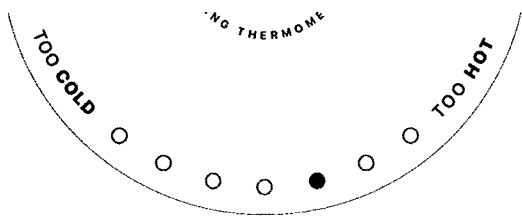
Figure 3:
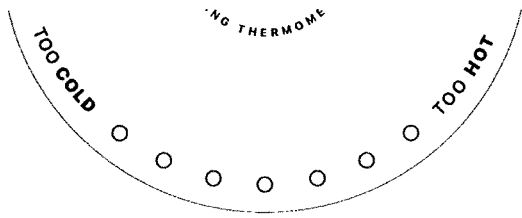

The LED lights 104 display the temperature state of the bottle. In a preferred embodiment, the LED lights comprise a colour display of three colours, being red, green and blue, to indicate a high temperature, a low temperature, and an optimum temperature state of the bottle. When the temperature state of the bottle is high (i.e. above 37.5° C.), the red LED lights will illuminate to alert the user that the liquid inside the bottle is too hot. The apparatus will have three red LED lights (as shown in FIG. 3). If the temperature is just above 37.5° C., a single red LED light may illuminate to indicate that the temperature of the contents of the bottle (e.g. milk) is slightly too hot. If the milk is hotter, the second and then the third red LED light may illuminate to indicate that the temperature of the milk is even hotter. As the temperature decreases to a range of 37.5° C. the red LED lights will gradually switch off as the milk cools. A single green LED light will illuminate at the range of 36.5° C. and 37.4° C. to indicate to the user that the milk inside the bottle is now at optimum drinking temperature. The colour display provides an easy to understand temperature reading without the need for the user to memorise temperature ranges or calculation. This feature makes it easier for caretakers such as babysitters and grandparents who can simply feed the milk to the baby once the green LED light illuminates and be assured that the milk is at optimum drinking temperature. The colour display also enables users to quickly predict how much cold or hot water may be added to the milk to lower or increase the temperature of the milk. If the temperature of the contents of the bottle falls below 36.5° C., one or more of the blue LED lights will illuminate. As the temperature drops below 36.5° C., more of the blue LED lights will illuminate to provide a visual indication that the contents of the bottle is too cool for drinking.

At the center of the upper surface 102, there is a center point 106. The center point 106 is the position at which the non-contact infrared thermometer measures the temperature of the bottle. The non-contact infrared thermometer (not shown in FIG. 1) is located inside the housing 101.

In a preferred embodiment, the non-contact thermometer will sense temperature of the bottle placed on the upper surface of the housing and sends a signal relating to the temperature to the processor. When the temperature state of the bottle continues to rise, the processor is configured to alert a user of an increase in temperature state of the bottle. The user is alerted by way of intermittent flashing of all LED lights.

During operation, the processor is configured to read temperature data and store each reading in a number array. The processor is also configured to read the temperature data for a predetermined period of time (e.g. over a 5 second period or 20 second period). An average of the temperature data is then calculated from the reading of the predetermined period. When the non-contact thermometer senses that the temperature state of the bottle is higher than the calculated average of the temperature data, the processor will signal to the user that the temperature state of the bottle is increasing.

In one embodiment, the processor determines an average temperature over a 20 second period, which can be taken to be indicative of a longer term average temperature. The processor also determines an average temperature over a 5 second period, which can be taken to be a short-term average temperature that closely approximates the actual temperature of the bottle. If the short-term average temperature is higher than the longer term average temperature, the processor determines that the temperature of the contents of the bottle is increasing and the warning sequence of LEDs is displayed. This warning sequence of LEDs will continue until the processor determines that the short-term average temperature is less than the longer-term average temperature, which indicates that the temperature of the contents of the bottle is decreasing.

Figure 2:
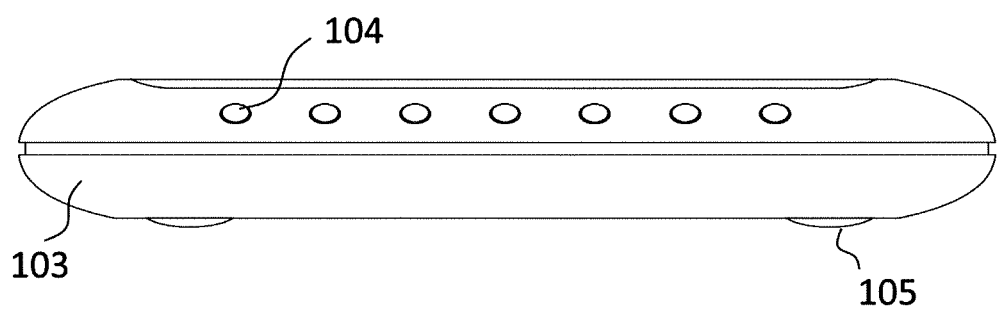
FIG. 2 is a front side view of the preferred embodiment in accordance with the present invention.

Referring to FIG. 2, FIG. 2 shows a frontal side view of the present invention. At the bottom of the base surface 103, there may be at least two raised feet 105 supporting the housing 101. In a preferred embodiment, the housing is shaped in a flat spheroid or disk-like appearance. However, the housing is not limited to any particular shape. For example, the housing can be cylindrical, rectangular or square in shape.

Referring to FIG. 3, FIG. 3 shows the indicators at different temperature state of the bottle. In particular, in FIG. 3, a display that comprises 7 LED lights is provided. The LED lights comprise three blue LED lights 111, 112, 113, a single green LED light 114 and three red LED lights 115, 116, 117. In a preferred embodiment, when the milk in the bottle is just too cool for a baby to comfortably drink, one blue LED will illuminate to indicate the cold temperature state of the bottle. Suitably, this is blue LED light 113 which is located next to green LED light 114. As the blue LED light 113 that is next to the green LED light 114 illuminates, this indicates that the temperature of the milk and the bottle is just below the optimum drinking temperature. As the temperature of the contents of the bottle cools further, or if the temperature of the contents of the bottle is more significantly cooler than the optimum temperature, the second blue LED light 112 and then the third blue LED light 111 will also illuminate. Therefore, if the bottle is far too cool to drink, all three blue LED lights 111, 112, 113 will be illuminated.

When the milk in the bottle is at an optimum drinking temperature, the single green LED light 114 will illuminate.

When the temperature of the milk in the bottle is slightly above the maximum optimum drinking temperature of 37.5° C., one red LED light will illuminate. Suitably, this is red LED light 115 that is located next to green LED light 114. When this red LED light 115 illuminates by itself, it indicates that the temperature of the contents of the bottle is just slightly too warm for drinking. If the temperature of the contents of the bottle is more significantly warmer, LED light 116 and possibly LED light 117 will also illuminate. If the temperature of the bottle is far too warm for drinking by a baby, all three red LED lights 115, 116, 117 will illuminate. The higher the temperature state of the bottle, a greater number of red LED lights will illuminate.

If the processor determines that the temperature of the contents of the bottle is increasing (for example, because the bottle has just come out of the microwave oven and hot parts of the liquid tend to spread throughout the entire contents of the bottle) all LED lights (red, green and blue) will illuminate at the same time if there is an uneven heating of the temperature state of the bottle. Alternatively, to provide an even greater visual waring to the user of the bottle, if the processor determines that the temperature of the contents of the bottle is increasing, all of the LED lights (red, green and blue) will intermittently flash on and off to serve as a prominent visual warning to the user of the bottle that the temperature of the bottle is increasing and the contents of the bottle may be too hot for a baby to drink.

Unlike prior art temperature indicators, embodiments of the present invention can provide a warning to mothers that the temperature of milk in a bottle is increasing, even if the thermometer in the apparatus indicates that the instantaneous temperature of the bottle is in a suitable range for drinking by a baby. If the temperature of the milk in the bottle is increasing, this can potentially lead to a baby drinking milk that is far too hot. The present invention, by providing an indication that the temperature of the bottle is increasing, allows the mother to wait for a period of time until the temperature of the bottle is stabilised and moved to an optimum temperature for drinking. This provides for enhanced safety to the baby and greater ease of mind to the mother. It also protects against any lag effects in measuring the temperature of the milk in the bottle.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An apparatus for indicating temperature of a liquid inside a bottle, comprising:
   a housing having an upper surface configured to support a bottle;
   a base surface configured to rest on a flat structure;
   a non-contact thermometer, the non-contact thermometer located inside the housing;
   one or more indicators to display or provide an indication of a temperature state of the bottle and the one or more indicators comprises an array of LED lights; and
   a processor;
   wherein
   the non-contact thermometer senses temperature of a bottle placed on the upper surface of the housing and sends signals relating to the temperature to the processor, wherein the processor is configured to provide an indication to warn a user if there is an increase in temperature state of the bottle; and,
   the array of LED lights will intermittently flash if the temperature of the bottle is increasing as a result of uneven heating.

2. The apparatus according to claim 1, wherein the array of LED lights comprises a colour display of at least three colours to indicate a high temperature, an optimum temperature and a low temperature state of the bottle.

3. The apparatus according to claim 2, wherein the array of LED lights will display a first colour, such as a red colour when the temperature state of the bottle is high.

4. The apparatus according to claim 3, wherein the array of LED lights will display a second colour, such as a green colour when the temperature state of the bottle is optimum.

5. The apparatus according to claim 4, wherein the array of LED lights will display a third colour, such as a blue colour when the temperature state of the bottle is too low.

6. The apparatus according to claim 1, wherein the array of LED lights is positioned in a circumference of the upper surface of the housing, extending part way around the circumference.

7. The apparatus according to claim 1, wherein, the non-contact thermometer is embedded in a center of the housing.

8. The apparatus according to claim 1, wherein the housing is cylindrical or flat spheroidal in shape.

9. The apparatus according to claim 1, wherein the housing houses a battery.

10. The apparatus according to claim 1, wherein the non-contact thermometer is a non-contact infrared thermometer.

11. The apparatus according to claim 1, wherein the non-contact thermometer provides a signal indicative of the temperature of the contents of the bottle to the processor.

12. The apparatus according to claim 1, wherein the processor is configured to read a temperature of the bottle over a predetermined period of time.

13. The apparatus according to claim 12, wherein the processor calculates an average of the temperature recorded over the predetermined period of time.

14. The apparatus according to claim 13, wherein the processor will alert the user of an increase in the temperature of the bottle when the temperature of the bottle is higher than the average of the temperature recorded over the predetermined period of time.

15. The apparatus according to claim 13, wherein the processor calculates an average temperature over a relatively longer period of time and also calculates an average temperature over a relatively short period of time.

16. The apparatus according to claim 12, wherein the predetermined period of time is 5 seconds.

17. The apparatus according to claim 12, wherein the predetermined period of time is 20 seconds.

18. An apparatus for indicating temperature of a liquid inside a bottle, comprising:
    a housing having an upper surface configured to support a bottle;
    a base surface configured to rest on a flat structure;
    a non-contact thermometer, the non-contact thermometer located inside the housing;
    one or more indicators to display or provide an indication of a temperature state of the bottle and the one or more indicators comprises an array of LED lights; and
    a processor;
    wherein
    the non-contact thermometer senses temperature of a bottle placed on the upper surface of the housing and sends signals relating to the temperature to the processor, wherein the processor is configured to provide an indication to warn a user if there is an increase in temperature state of the bottle; and,
    the array of LED lights will intermittently flash if the temperature of the bottle is increasing as a result of uneven heating or excessive heating, or if the bottle has only just been removed from a heating environment;
    wherein the processor is configured to read a temperature of the bottle over a predetermined period of time;
    wherein the processor calculates an average of the temperature recorded over the predetermined period of time;
    wherein the processor calculates an average temperature over a relatively longer period of time and also calculates an average temperature over a relatively short period of time;
    wherein a warning sequence of lights are displayed to warn the user that the temperature state of the bottle is increasing when the average temperature calculated over the relatively short period of time is greater than the average temperature calculated over the relatively longer period of time.

* * * * *